(12) United States Patent
Kim

(10) Patent No.: US 10,789,143 B2
(45) Date of Patent: Sep. 29, 2020

(54) CONTROLLER WITH ROM, OPERATING METHOD THEREOF AND MEMORY SYSTEM INCLUDING THE CONTROLLER

(71) Applicant: SK hynix Inc., Gyeonggi-do (KR)

(72) Inventor: Jung-Ae Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 219 days.

(21) Appl. No.: 16/109,129

(22) Filed: Aug. 22, 2018

(65) Prior Publication Data
US 2019/0251011 A1    Aug. 15, 2019

(30) Foreign Application Priority Data
Feb. 9, 2018    (KR) .................. 10-2018-0016289

(51) Int. Cl.
| | |
|---|---|
| *G06F 12/00* | (2006.01) |
| *G06F 11/263* | (2006.01) |
| *G06F 11/27* | (2006.01) |
| *G06F 11/36* | (2006.01) |
| *G06F 9/4401* | (2018.01) |
| *G06F 11/22* | (2006.01) |
| *G06F 11/10* | (2006.01) |

(52) U.S. Cl.
CPC ........ *G06F 11/2635* (2013.01); *G06F 9/4401* (2013.01); *G06F 11/1048* (2013.01); *G06F 11/2268* (2013.01); *G06F 11/27* (2013.01); *G06F 11/3656* (2013.01)

(58) Field of Classification Search
None
See application file for complete search history.

(56) References Cited

U.S. PATENT DOCUMENTS

| | | | |
|---|---|---|---|
| 2009/0204751 A1* | 8/2009 | Kushita ................. | G06F 15/16 711/104 |
| 2010/0042984 A1* | 2/2010 | Daftardar ................. | G06F 8/65 717/168 |
| 2018/0059982 A1* | 3/2018 | Balakrishnan ........ | G06F 3/0604 |

FOREIGN PATENT DOCUMENTS

| | | |
|---|---|---|
| KR | 1020160086949 | 7/2016 |
| KR | 1020160144734 | 12/2016 |

* cited by examiner

*Primary Examiner* — Jason W Blust
(74) *Attorney, Agent, or Firm* — IP & T Group LLP

(57) ABSTRACT

A controller may include: a ROM code register configured to generate and store a ROM code including a plurality of firmware images; and a ROM controller configured to change an operation setting of a ROM based on an operation firmware image of the plurality of firmware images, wherein each of the plurality of firmware images includes an image header including attribute information on a corresponding firmware image and image data, and wherein the operation firmware image includes, as its image header, an operation image header, which includes an operation mode field indicating whether the operation setting of the ROM is changed, and, as its image data, operation image data including information on the operation setting of the ROM.

20 Claims, 11 Drawing Sheets

CONTROLLER WITH ROM, OPERATING METHOD THEREOF AND MEMORY SYSTEM INCLUDING THE CONTROLLER

CROSS-REFERENCE TO RELATED APPLICATION

The present application claims priority under 35 U.S.C. § 119(a) to Korean Patent Application No. 10-2018-0016289, filed on Feb. 9, 2018, the disclosure of which is incorporated herein by reference in its entirety.

BACKGROUND

1. Field

Various embodiments of the present invention relate to a controller. Particularly, embodiments relate to a controller capable of efficiently managing data, and an operating method thereof.

2. Description of the Related Art

As the paradigm for computing environments moves toward ubiquitous computing, people are able to use computing systems anytime anywhere. In the era of ubiquitous computing, the demand for portable electronic devices, such as mobile phones, digital cameras and laptop computers are soaring. Those electronic devices generally include a memory system using a memory device as a data storage device. The data storage device may be used as a main memory or an auxiliary memory of a portable electronic device.

Since the data storage device uses a memory device that does not have a mechanical driving assembly (e.g., a mechanical arm with a read/write head) as compared with a hard disk device, such data storage device may have excellent stability and durability. Also, the data storage device can have a quick data access rate with low power consumption, as compared to the hard disk device. Non-limiting examples of the data storage device having such advantages include Universal Serial Bus (USB) memory devices, memory cards of diverse interfaces, Solid-State Drives (SSD), and the like.

SUMMARY

Various embodiments of the present invention are directed to a controller capable of supporting efficiently a ROM operation by adding special fields to a header of the firmware image.

In accordance with an embodiment of the present invention, a controller may include: a ROM code register configured to generate and store a ROM code including a plurality of firmware images; and a ROM controller configured to change an operation setting of a ROM based on an operation firmware image of the plurality of firmware images, wherein each of the plurality of firmware images includes an image header including attribute information on a corresponding firmware image and image data, and wherein the operation firmware image includes, as its image header, an operation image header, which includes an operation mode field indicating whether the operation setting of the ROM is changed, and, as its image data, operation image data including information on the operation setting of the ROM.

In accordance with an embodiment of the present invention, an operating method of controller may include: generating and storing a ROM code including a plurality of firmware images; and changing an operation setting of a ROM based on an operation firmware image of the plurality of firmware images, wherein each of the plurality of firmware images includes an image header including attribute information on a corresponding firmware image and image data, and wherein the operation firmware image includes, as its image header, an operation image header, which includes an operation mode field indicating whether the operation setting of the ROM is changed, and, as its image data, operation image data including information on the operation setting of the ROM.

In accordance with an embodiment of the present invention, a memory system may include: a ROM code register configured to store a ROM code including a plurality of firmware images; and a ROM controller configured to change an operation setting of a ROM of the memory device based on an operation firmware image of the plurality of firmware images, wherein each of the plurality of firmware images includes an image header including attribute information on a corresponding firmware image and image data, wherein the image header of the operation firmware image includes an operation mode field indicating whether the operation setting of the ROM is changed, and the image data of the operation firmware image includes information on the operation setting of the ROM, and wherein the ROM controller is further configured to determine whether the operation setting of the ROM is changed, based on the operation mode field of the image header of the operation firmware image, and to change the operation setting of the ROM based on the image data of the operation firmware image.

BRIEF DESCRIPTION OF THE DRAWINGS

The description herein makes reference to the accompanying drawings in which like reference numerals refer to like parts throughout the several views, and wherein.

DETAILED DESCRIPTION

Figure 1:
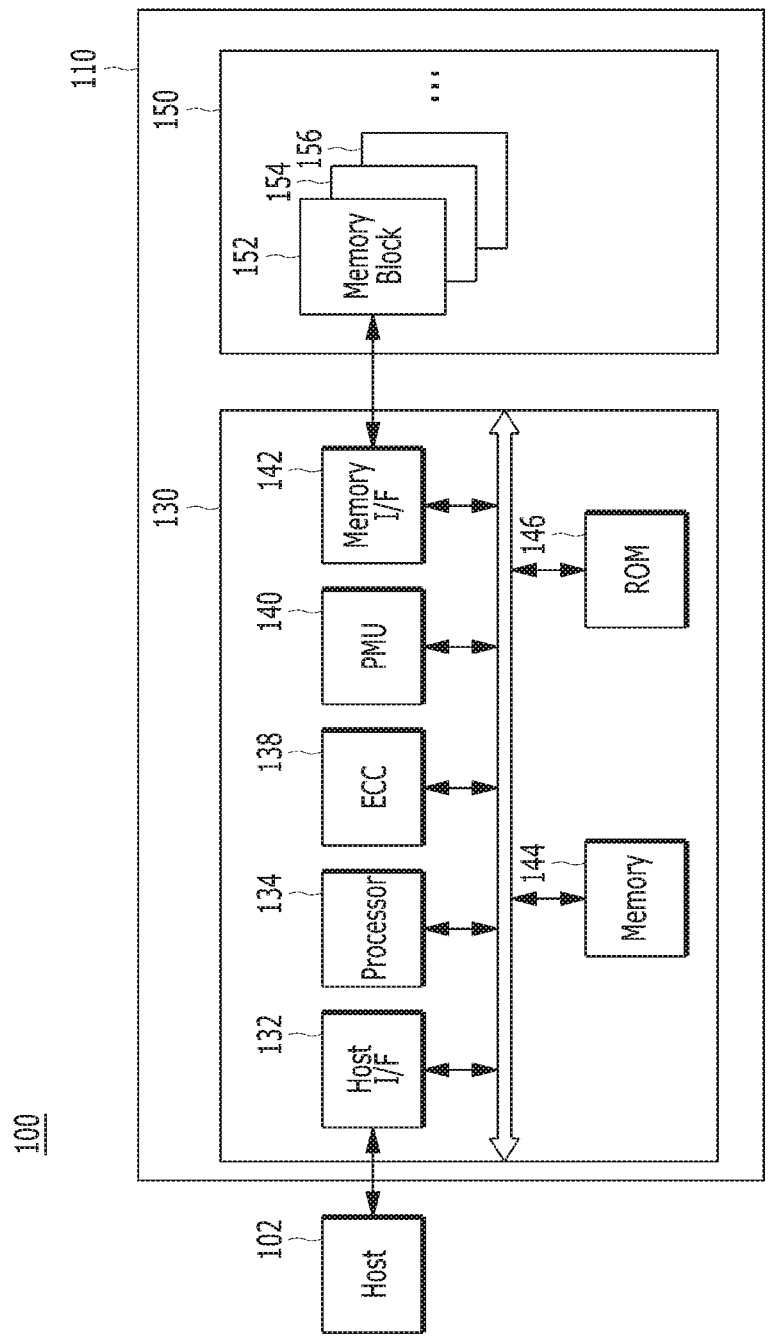
FIG. 1 is a block diagram illustrating a data processing system including a memory system in accordance with an embodiment of the disclosure.

Various embodiments of the disclosure are described below in more detail with reference to the accompanying drawings. However, elements and features of the disclosure may be arranged or configured differently than in the disclosed embodiments. Thus, the present invention is not limited to the embodiments set forth herein. Rather, the described embodiments are provided so that this disclosure is thorough and complete and fully conveys the disclosure to those skilled in the art to which this invention pertains. Throughout the disclosure, like reference numerals refer to like parts throughout the various figures and examples of the disclosure. Also, throughout the specification, reference to "an embodiment," "another embodiment," and the like is not necessarily to only one embodiment, and different references to any such phrase are not necessarily to the same embodiment(s).

It will be understood that, although the terms "first", "second", "third", and the like may be used herein to identify various elements, these elements are not limited by these terms. These terms are used to distinguish one element from another element that otherwise have the same or similar names. Thus, a first element described below could also be termed as a second or third element without departing from the spirit and scope of the present invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments and is not intended to be limiting of the present invention.

As used herein, singular forms are intended to include the plural forms and vice versa, unless the context clearly indicates otherwise.

It will be further understood that the terms "comprises," "comprising," "includes," and "including" when used in this specification, specify the presence of the stated elements but do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include, for example, a portable electronic device such as a mobile phone, an MP3 player and a laptop computer or an electronic device such as a desktop computer, a game player, a TV, a projector and the like.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Examples of suitable storage devices include a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device such as a dynamic random access memory (DRAM) and a static RAM (SRAM) and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM) and/or a flash memory.

The memory system 110 may include a memory device 150 which stores data to be accessed by the host 102, and a controller 130 which may control storage of data in the memory device 150.

The controller 130 and the memory device 150 may be integrated into a single semiconductor device, which may be included in any of the various types of memory systems as exemplified above.

The memory system 110 may be configured as a part of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3D television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while an electrical power is not supplied. The memory device 150 may store data provided from the host 102 through a write operation, and provide data stored therein to the host 102 through a read operation. The memory device 150 may include a plurality of memory blocks 152 to 156, each of which may include a plurality of pages. Each of the plurality of pages may include a plurality of memory cells to which a plurality of word lines (WL) are electrically coupled.

The controller 130 may control overall operations of the memory device 150, such as read, write, program and erase operations. The controller 130 of the memory system 110 may control the memory device 150 in response to a request from the host 102. The controller 130 may provide the data, read from the memory device 150, to the host 102, and/or may store the data, provided by the host 102, into the memory device 150.

The controller 130 may include a host interface (I/F) 132, a processor 134, an error correction code (ECC) component 138, a power management unit (PMU) 140, a memory device controller such as a memory interface (I/F) 142, a memory 144 and a ROM (read only memory) 146 all operatively coupled via an internal bus.

The host interface 132 may process commands and data provided from the host 102, and may communicate with the host 102 through at least one of various interface protocols such as universal serial bus (USB), multimedia card (MMC), peripheral component interconnect-express (PCI-E), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE).

The ECC component 138 may detect and correct errors in the data read from the memory device 150 during the read operation. When the number of the error bits is greater than or equal to a threshold number of correctable error bits, the ECC component 138 may not correct error bits but may output an error correction fail signal indicating failure in correcting the error bits.

The ECC component 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and the like. The ECC component 138 may include suitable circuits, modules, systems and/or devices for performing the error correction operation based on at least one of the above described codes.

The PMU 140 may provide and manage power of the controller 130.

The memory interface 142 may serve as an interface for handling commands and data transferred between the controller 130 and the memory device 150, so as to allow the controller 130 to control the memory device 150 in response to a request delivered from the host 102. The memory interface 142 may generate a control signal for the memory device 150 and may process data entered into or outputted from the memory device 150 under the control of the processor 134, in a case when the memory device 150 is a flash memory and, in particular, when the memory device 150 is a NAND flash memory.

The memory 144 may serve as a working memory of the memory system 110 and the controller 130, and may store temporary or transactional data for operating or driving the memory system 110 and the controller 130. The controller 130 may control the memory device 150 in response to a request from the host 102. The controller 130 may deliver data read from the memory device 150 into the host 102, may store data entered through the host 102 within the memory device 150. The memory 144 may be used to store data required for the controller 130 and the memory device 150 in order to perform these operations.

The memory 144 may be implemented with a volatile memory. The memory 144 may be implemented with a static random access memory (SRAM) or a dynamic random access memory (DRAM). Although FIG. 1 exemplifies the memory 144 disposed within the controller 130, the disclosure is not limited thereto. That is, the memory 144 may be located inside or outside the controller 130. For instance, the memory 144 may be embodied by an external volatile memory having a memory interface transferring data and/or signals transferred between the memory 144 and the controller 130.

The ROM 146 may include a nonvolatile memory in which information is retained although power is off. For example, the ROM 146 may store a plurality of ROM codes. The ROM codes may include codes for executing firmware and are less likely to be corrected after packaging.

The processor 134 may control the overall operations of the memory system 110. The processor 134 may drive or execute a firmware to control the overall operations of the memory system 110. The firmware may be referred to as a flash translation layer (FTL).

An FTL may perform an operation as an interface between the host 102 and the memory device 150. The host 102 may transmit requests for write and read operations to the memory device 150 through the FTL.

The FTL may manage operations of address mapping, garbage collection, wear-leveling and so forth. Particularly, the FTL may store map data. Therefore, the controller 130 may map a logical address, which is provided from the host 102, to a physical address of the memory device 150 through the map data. The memory device 150 may perform an operation like a general device because of the address mapping operation. Also, through the address mapping operation based on the map data, when the controller 130 updates data of a particular page, the controller 130 may program new data on another empty page and may invalidate old data of the particular page due to a characteristic of a flash memory device. Further, the controller 130 may store map data of the new data into the FTL.

The processor 134 may be implemented with a microprocessor or a central processing unit (CPU). The memory system 110 may include one or more processors 134.

A management unit (not shown) may be included in the processor 134. The management unit may perform bad block management of the memory device 150. The management unit may find bad memory blocks in the memory device 150, which are in unsatisfactory condition for further use, as well as perform management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 100, and thus reliable bad block management is required.

Figure 2:
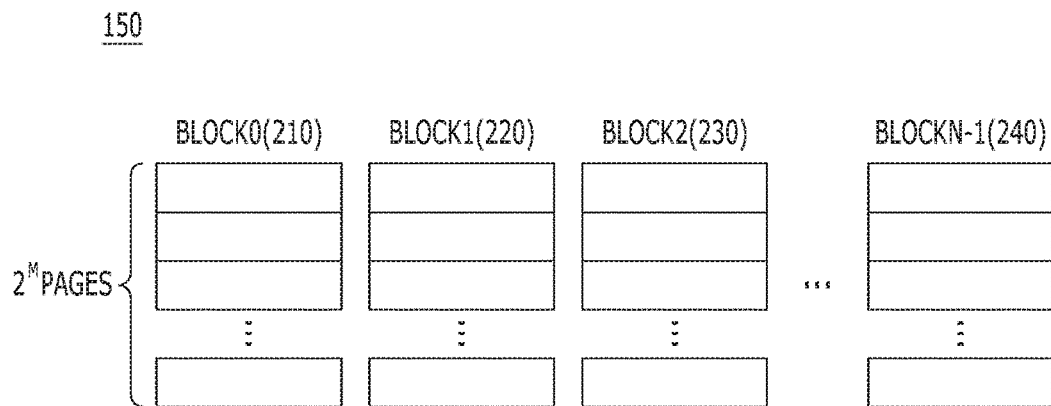
FIG. 2 is a schematic diagram illustrating an exemplary configuration of a memory device of the memory system shown in FIG. 1.

FIG. 2 is a schematic diagram illustrating the memory device 150.

Referring to FIG. 2, the memory device 150 may include the plurality of memory blocks BLOCK 0 to BLOCKN−1, and each such block may include a plurality of pages, for example, $2^M$ pages, the number of which may vary according to circuit design. The memory blocks may be single level cell (SLC) memory blocks or multi-level cell (MLC) memory blocks, according to the number of bits which may be stored or expressed in each memory cell. The SLC memory block may include a plurality of pages which are implemented with memory cells each storing 1-bit data. The MLC memory block may include a plurality of pages which are implemented with memory cells each storing multi-bit data, for example, two or more-bit data. An MLC memory block including a plurality of pages which are implemented with memory cells each storing 3-bit data may be defined as a triple level cell (TLC) memory block.

Figure 3:
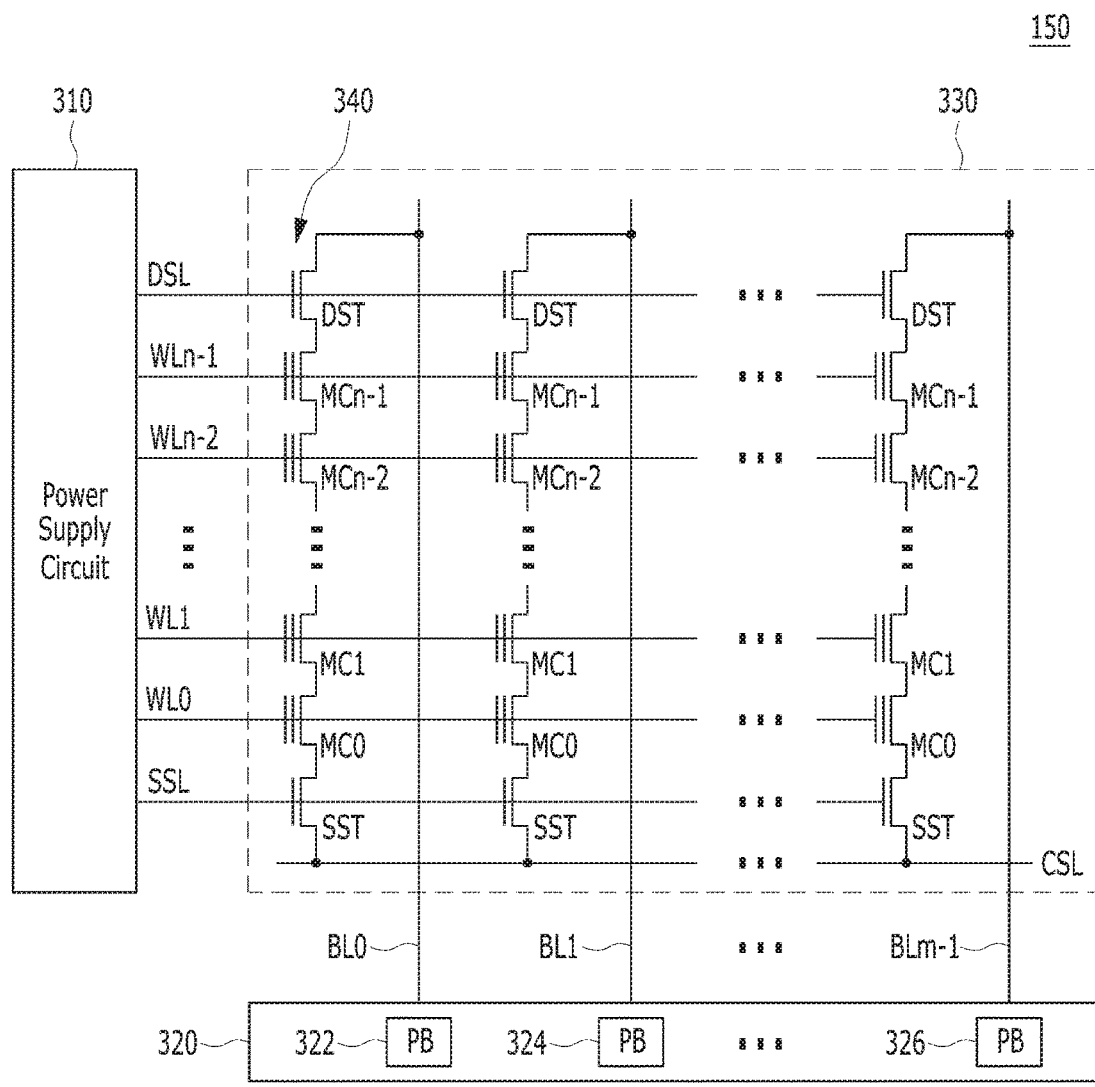
FIG. 3 is a circuit diagram illustrating an exemplary configuration of a memory cell array of a memory block in the memory device shown in FIG. 2.

FIG. 3 is a circuit diagram illustrating a memory block 330 in the memory device 150.

Referring to FIG. 3, the memory block 330 may correspond to any of the plurality of memory blocks 152 to 156.

Referring to FIG. 3, the memory block 330 of the memory device 150 may include a plurality of cell strings 340 which are electrically coupled to bit lines BL0 to BLm−1, respectively. The cell string 340 of each column may include at least one drain select transistor DST and at least one source select transistor SST. A plurality of memory cells or a plurality of memory cell transistors MC0 to MCn−1 may be electrically coupled in series between the select transistors DST and SST. The respective memory cells MC0 to MCn−1 may be configured by single level cells (SLC) each of which may store 1 bit of information, or by multi-level cells (MLC) each of which may store data information of a plurality of bits. The strings 340 may be electrically coupled to the corresponding bit lines BL0 to BLm−1, respectively. For reference, in FIG. 3, 'DSL' denotes a drain select line, 'SSL' denotes a source select line, and 'CSL' denotes a common source line.

While FIG. 3 shows, as an example, that the memory block 330 is constituted with NAND flash memory cells, the memory block 330 of the memory device 150 according to embodiments is not limited to a NAND flash memory. The memory block 330 may be realized by a NOR flash memory, a hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A power supply circuit 310 of the memory device 150 may provide word line voltages, for example, a program voltage, a read voltage and a pass voltage, to be supplied to respective word lines according to an operation mode and voltages to be supplied to bulks, for example, well regions in which the memory cells are formed. The power supply circuit 310 may perform a voltage generating operation under the control of a control circuit (not shown). The power supply circuit 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification operation or a normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
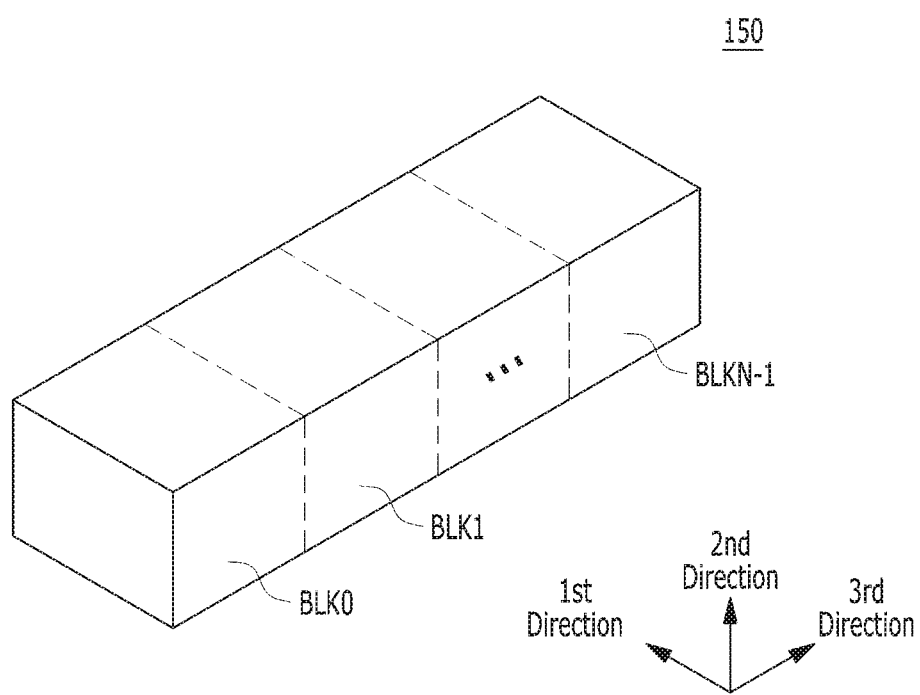
FIG. 4 is a schematic diagram illustrating an exemplary three-dimensional structure of the memory device shown in FIG. 2.

FIG. 4 is a schematic diagram illustrating a 3D structure of the memory device 150.

The memory device 150 may be embodied by a 2D or 3D memory device. Specifically, as illustrated in FIG. 4, the memory device 150 may be embodied in a nonvolatile memory device having a 3D stack structure. When the memory device 150 has a 3D structure, the memory device 150 may include a plurality of memory blocks BLK0 to BLKN−1 each having a 3D structure (or a vertical structure).

The ROM code is basically implemented to operate at a low frequency clock signal for a stable operation. When a different storage device is used or the clock frequency is increased, the ROM code should be corrected for easy ROM operation. However, when the ROM code is initially set, it may not be possible to change the ROM code due to its characteristics as long as ROM revision is not performed. Furthermore, even though the ROM revision is performed, the time required for implementation and verification may delay further use or implementation. Therefore, it is very inefficient to frequently change the ROM code in such a situation.

Figure 5:
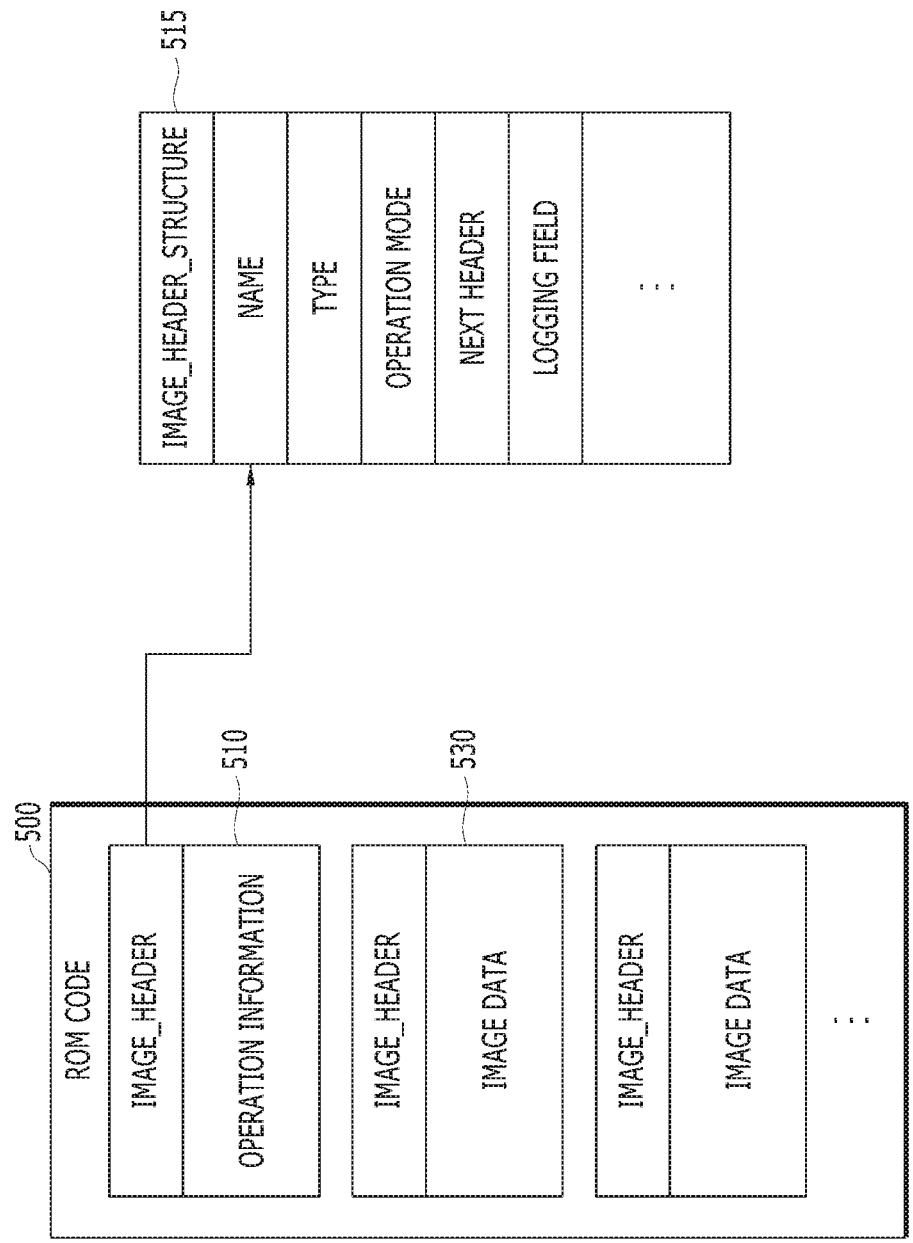
FIG. 5 schematically illustrates the structure of a ROM code in accordance with an embodiment of the disclosure.
Figure 6:
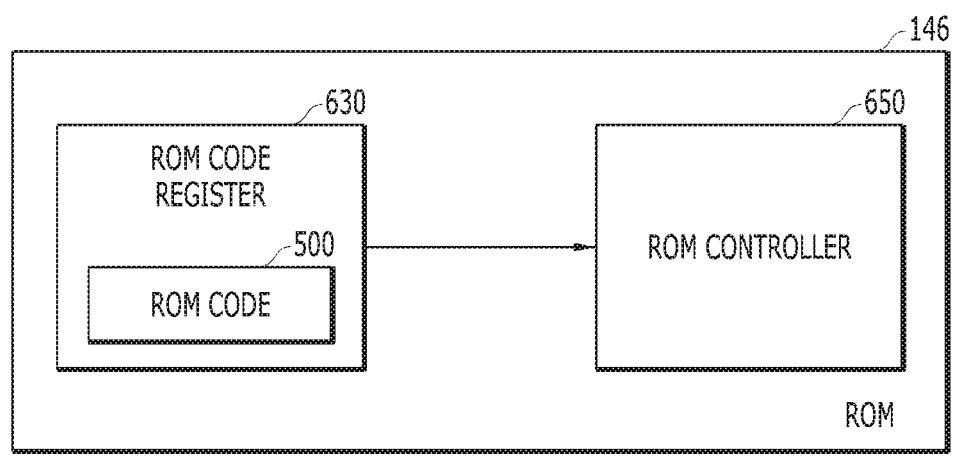
FIG. 6 schematically illustrates the structure of the ROM in accordance with an embodiment of the disclosure.
Figure 7:
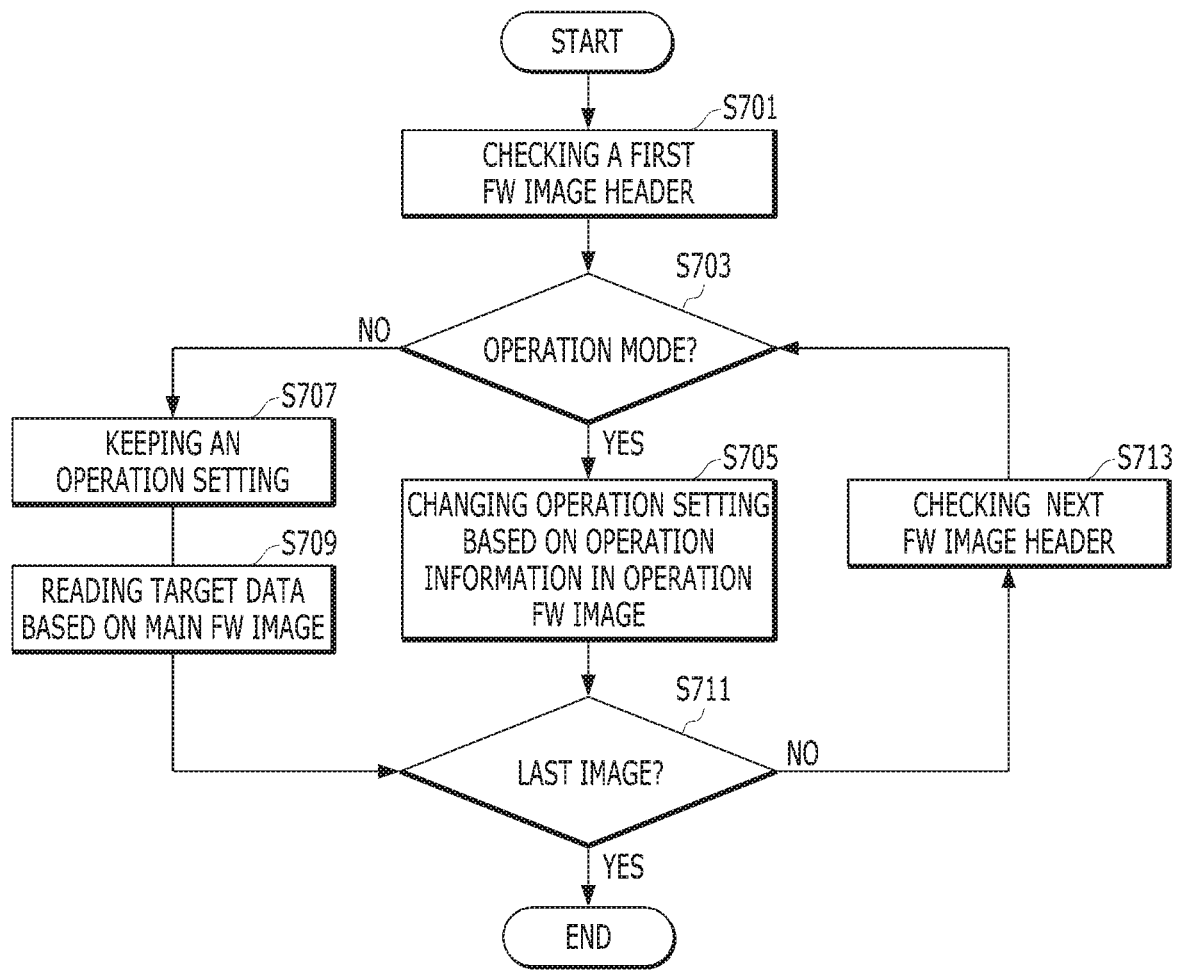
FIG. 7 is a flowchart schematically illustrating an operation process of the controller in accordance with an embodiment of the disclosure.

An embodiment of the present invention proposes a controller capable of flexibly performing the operation of the ROM 146 by adding an operation field to a firmware image header without changing the ROM code itself whenever there is a specific setting value to be changed, and an operation method of the controller. With reference to FIG. 5 to FIG. 7, the controller and the operation method thereof in accordance with an embodiment of the present invention will be described.

FIG. 5 schematically illustrates the structure of a ROM code 500 in accordance with an embodiment of the present invention. The ROM code 500 may be generated and stored by a ROM code register 630 of the ROM 146 to be described with reference to FIG. 6.

The ROM code 500 may include a plurality of firmware images. The firmware image may be divided into an operation firmware image 510 and a main firmware image 530. The firmware image may have a structure in which an image header and image data are linked to each other in a linked list form. Accordingly, the firmware image may be read in sequence of the image header including attribute information, and the image data.

The operation firmware image 510 may include information for changing operation setting (e.g., OPERATION INFORMATION) of the ROM 146. Specifically, an image header of the operation firmware image 510 may have an image_header_structure 515 that includes operation mode information (OPERATION MODE) as well as a name (NAME), a type (TYPE), and information NEXT HEADER, which is to be read subsequently. Whether or not it is necessary to change the operation setting of the ROM 146, is displayed in the operation mode information. In addition, the operation firmware image 510 may include operation information (OPERATION INFORMATION) of the ROM 146 as the image data of the operation firmware image 510. Accordingly, the ROM 146 may recognize the necessity of re-setting the operation mode through the image header of the operation firmware image 510, and may re-set an operation based on the operation information which is the image data. The image_header_structure 515 of the image header may further include a logging field, which may indicate the necessity of a logging operation. When logging is required for debugging of the operation setting to be changed, the logging operation is processed to be activated in the logging field, in which case all logs of the ROM code 500 are activated by a setting value of a corresponding field, so that the ROM 146 may perform universal asynchronous receiver/transmitter (UART) debugging.

The main firmware image 530 may include image data corresponding to target data stored in the memory device 150.

FIG. 6 schematically illustrates the structure of the ROM 146 in accordance with an embodiment of the present invention.

The ROM 146 may include a ROM code register 630 and a ROM controller 650.

The ROM code register 630 may generate and store ROM codes for executing firmware (FW). That is, the ROM code register 630 may generate and store the ROM code 500 including the operation firmware image and the main firmware image. Particularly, the ROM code register 630 may generate the operation firmware image 510 including information for changing the operation setting of the ROM 146 (e.g., a clock setting, a PLL setting, and the like). Furthermore, the ROM code register 630 may generate the operation firmware image 510 including information for activating all the logs of the ROM code 500.

The ROM controller 650 may read the ROM code 500 stored in the ROM code register 630. The ROM controller 650 may distinguish the operation firmware image 510 from the main firmware image 530 through the image header.

If the ROM controller 650 reads the operation firmware image 510, the ROM controller 650 may change the operation setting of the ROM 146 based on the image data of the operation firmware image 510. For example, when it is necessary to change an operating clock of the ROM 146, the ROM controller 650 may change the operation setting of the ROM 146. Specifically, the ROM controller 650 may change the operating clock of the ROM 146 from a single data rate (SDR) to a desired clock rate, e.g., from the SDR to a double data rate (DDR), or from the DDR to a desired clock rate, e.g., from the DDR to the SDR. Furthermore, when logging information for the debugging of the ROM 146 is required, the ROM controller 650 may change the operation setting of the ROM 146.

When the ROM controller 650 reads the main firmware image 530, the ROM controller 650 may control the memory device 150 such that the target data stored in the memory device 150 is read based on the image data of the main firmware image 530.

When a read operation for a current firmware image is completed, the ROM controller 650 may read a next firmware image based on the image header. When reading the first firmware image of the ROM code 500, the ROM controller 650 may read the firmware image according to a basic operation setting of the ROM 146, which setting may be set in advance. However, when the operation setting of the ROM 146 is changed by reading the operation firmware image later, the ROM controller 650 may retain the changed operation setting of the ROM 146 and read the firmware image.

In addition, the ROM controller 650 may determine activation or deactivation of the logging field based on the image header of the operation firmware image 510. If the logging field has been activated, all the logs of the ROM code 500 are activated by the setting value of the logging field, so that the ROM controller 650 may perform the UART debugging.

FIG. 7 is a flowchart schematically illustrating an operation process of the controller 130 in accordance with an embodiment of the present invention.

In step S701, the ROM controller 650 may check the image header of the first firmware image included in the target ROM code 500 stored in the ROM code register 630.

In step S703, based on the result of the check of the image header, the ROM controller 650 may determine whether there is activation information on the operation mode. That is, the ROM controller 650 may determine whether a firmware image currently being read is the operation firmware image 510 or the main firmware image 530.

When the operation mode has been activated ('YES' in step S703), the ROM controller 650 may change the operation setting of the ROM 146 based on the operation information (OPERATION INFORMATION) included in the operation firmware image in step S705.

However, when the operation mode has not been activated ('NO' in step S703), the ROM controller 650 may keep the already set operation setting of the ROM 146 in step S707.

In step S709, the ROM controller 650 may control the memory device 150 such that target data is read based on the main firmware image 530.

In step S711, the ROM controller 650 may check whether the currently read firmware image is the last firmware image in the target ROM code 500. When the currently read firmware image is not the last firmware image ('NO' in step S711), the ROM controller 650 may check an image header of a next firmware image in step S713. Then, the process returns to step S703.

When the currently read firmware image is the last firmware image ('YES' in step S711), the ROM controller 650 may end the process.

A data processing system and electronic devices which may be constituted with the memory system 110 including the memory device 150 and the controller 130, which are described above with reference to FIGS. 1 to 7, will be described in detail with reference to FIGS. 8 to 15.

FIGS. 8 to 15 are diagrams schematically illustrating exemplary applications of the data processing system of FIGS. 1 to 7 according to various embodiments.

Figure 8:
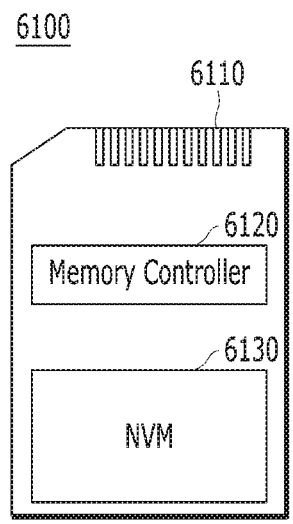
FIGS. 8 to 16 are diagrams schematically illustrating exemplary applications of a data processing system, in accordance with various embodiments of the present invention.

FIG. 8 is a diagram schematically illustrating, as an example of the data processing system, a memory card system including the memory system in accordance with an embodiment.

Referring to FIG. 8, the memory card system 6100 may include a memory controller 6120, a memory device 6130 and a connector 6110.

More specifically, the memory controller 6120 may be connected to the memory device 6130, and may be configured to access the memory device 6130. The memory device 6130 may be embodied as a nonvolatile memory. By way of example but not limitation, the memory controller 6120 may be configured to control read, write, erase and background operations onto the memory device 6130. The memory controller 6120 may be configured to provide an interface between the memory device 6130 and a host and/or a drive firmware for controlling the memory device 6130. That is, the memory controller 6120 may correspond to the controller 130 in the memory system 110 described with reference to FIGS. 1 to 7, while the memory device 6130 may correspond to the memory device 150 described with reference to FIGS. 1 to 7.

Thus, the memory controller 6120 may include a RAM, a processor, a host interface, a memory interface and an error correction component. The memory controller 130 may further include the elements described in FIG. 1.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with an embodiment may be applied to wired/wireless electronic devices, particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 1.

The memory controller 6120 and the memory device 6130 may be integrated into a single semiconductor device. For example, the memory controller 6120 and the memory device 6130 may be so integrated to form a solid state driver (SSD) or a memory card. Examples of such memory cards include a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC), and a universal flash storage (UFS).

Figure 9:
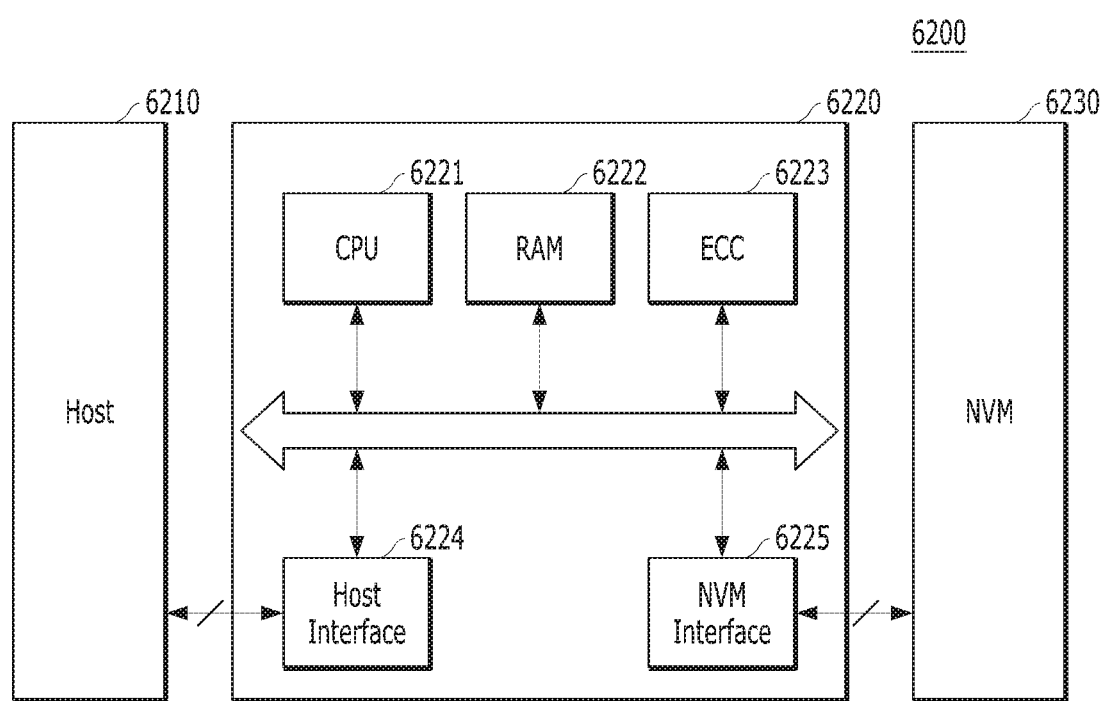

FIG. 9 is a diagram schematically illustrating another example of the data processing system including a memory system, in accordance with an embodiment.

Referring to FIG. 9, the data processing system 6200 may include a memory device 6230 having one or more nonvolatile memories and a memory controller 6220 for controlling the memory device 6230. The data processing system 6200 illustrated in FIG. 9 may serve as a storage medium such as a memory card (CF, SD, micro-SD or the like) or USB device, as described with reference to FIG. 1. The memory device 6230 may correspond to the memory device 150 in the memory system 110 described in FIGS. 1 to 7, and the memory controller 6220 may correspond to the controller 130 in the memory system 110 described in FIGS. 1 to 7.

The memory controller 6220 may control a read, write, or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control the operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC component 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. in this case, the ECC circuit 6223 may correct an error using the parity bit For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit to, or receive from, the host 6210 data or signals through the host interface 6224, and may transmit to, or receive from, the memory device 6230 data or signals through the NVM interface 6225. The host interface 6224 may be connected to the host 6210 through a PATA bus, a SATA bus, a SCSI, an USB, a PCIe, or a NAND interface. The memory controller 6220 may have a wireless communication function with a mobile communication protocol such as WiFi or Long Term Evolution (LTE). The memory controller 6220 may be connected to an external device, e.g., the host 6210, or another external device, and then transmit/receive data to/from the external device. As the memory controller 6220 is configured to communicate with the external device through one or more of various communication protocols, the memory system and the data processing system in accordance with an embodiment may be applied to wired/wireless electronic devices, particularly a mobile electronic device.

Figure 10:
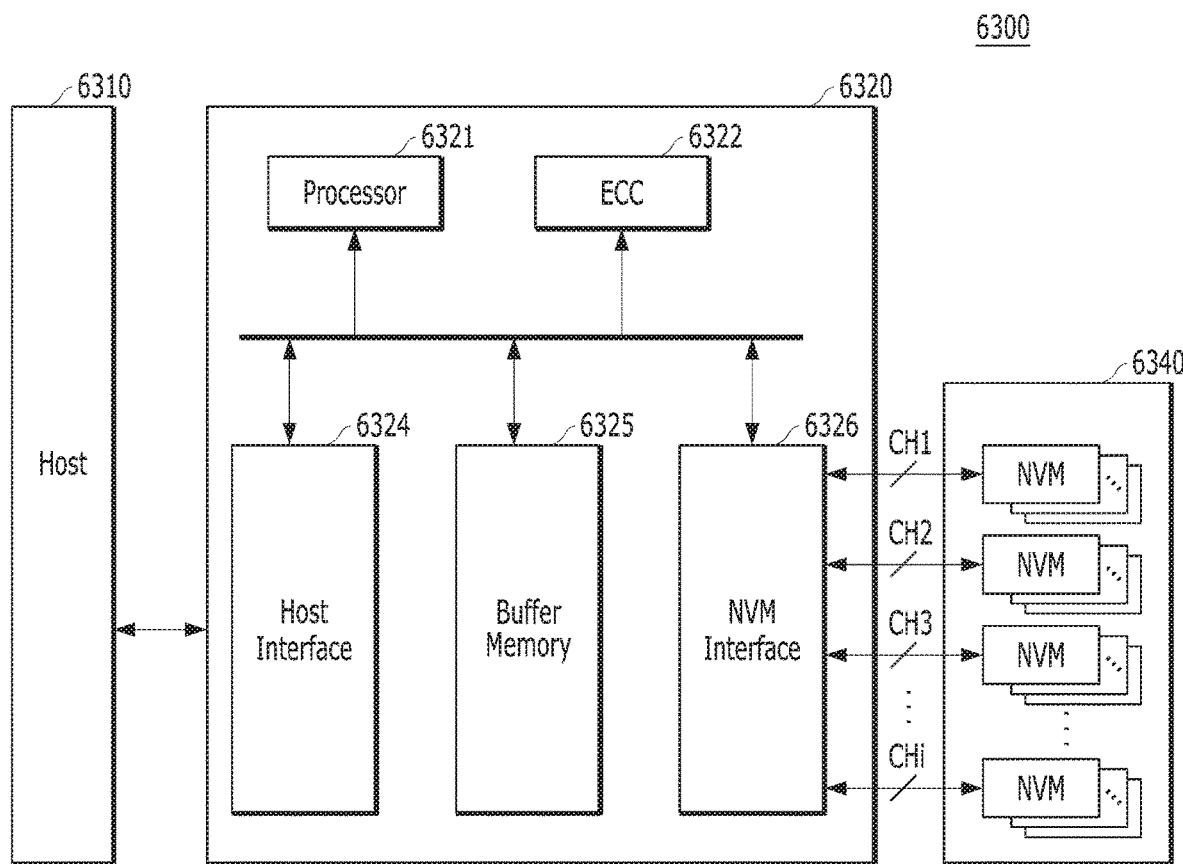

FIG. 10 is a diagram schematically illustrating another example of the data processing system including the memory system in accordance with an embodiment. FIG. 10 schematically illustrates an SSD to which the memory system in accordance with an embodiment is applied.

Referring to FIG. 10, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM in the memory device 6340, or temporarily store meta data of the plurality of flash memories NVM, for example, map data including a mapping table. The buffer memory 6325 may be embodied by volatile memories such as a DRAM, an SDRAM, a DDR SDRAM, an LPDDR SDRAM and a GRAM or nonvolatile memories such as an FRAM, a ReRAM, a STT-MRAM and a PRAM. By way of example, FIG. 10 illustrates that the buffer memory 6325 is disposed in the controller 6320, but the buffer memory 6325 may be located or disposed external to the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, i.e., RAID level information of the write command provided from the host 6310 in the SSDs 6300, and may output data corresponding to the write command to the selected SSDs 6300. Furthermore, when the RAID controller performs a read operation in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 11:
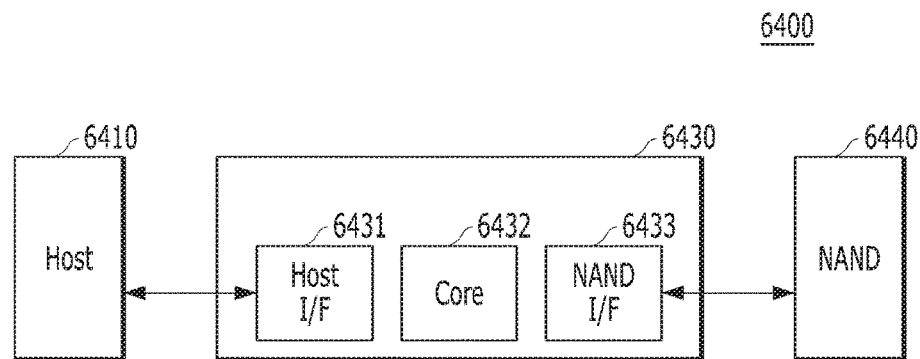
Figure 12:
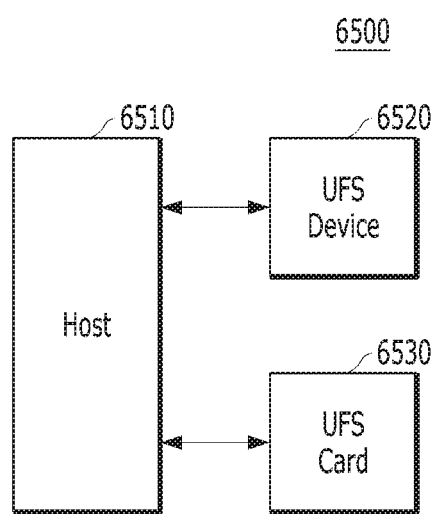
Figure 13:
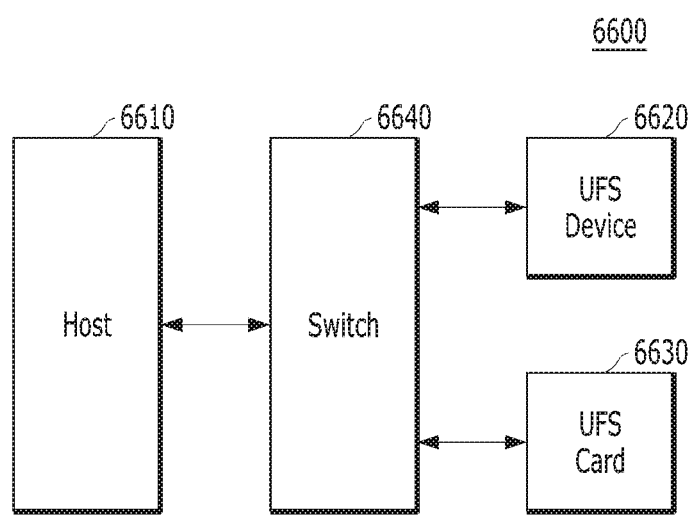
Figure 14:
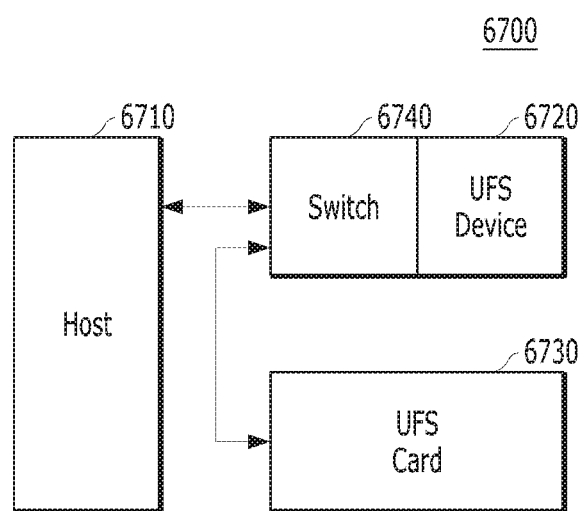
Figure 15:
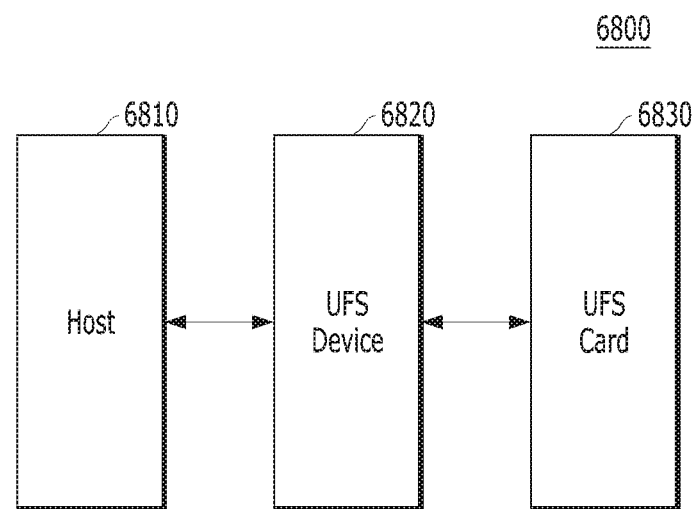

FIG. 11 is a diagram schematically illustrating another example of the data processing system including the memory system in accordance with an embodiment. In particular, FIG. 11 schematically illustrates an embedded Multi-Media Card (eMMC) to which the memory system may be applied.

Referring to FIG. 11, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels.

The controller 6430 may include one or more cores 6432, a host interface 6431 and a memory interface, for example, a NAND interface 6433.

The core 6432 may control the operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 12 to 15 are diagrams schematically illustrating other examples of the data processing system including the memory system in accordance with an embodiment. In particular, FIGS. 12 to 15 schematically illustrate UFS (Universal Flash Storage) systems to which the memory system may be applied.

Referring to FIGS. 12 to 15, the UFS systems 6500, 6600, 6700 and 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700 and 6800 may communicate with external devices, e.g., wired/wireless electronic devices or particularly mobile electronic devices through UFS protocols, and the UFS devices 6520, 6620, 6720, 6820 and the UFS cards 6530, 6630, 6730, 6830 may be embodied by the memory system 110 illustrated in FIG. 1. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 9 to 11, and the UFS cards 6530, 6630, 6730, 6830 may be embodied in the form of the memory card system 6100 described with reference to FIG. 8.

Furthermore, in the UFS systems 6500, 6600, 6700 and 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through various protocols other than the UFS protocol, e.g., UFDs, MMC, SD, mini-SD, and micro-SD.

Figure 16:
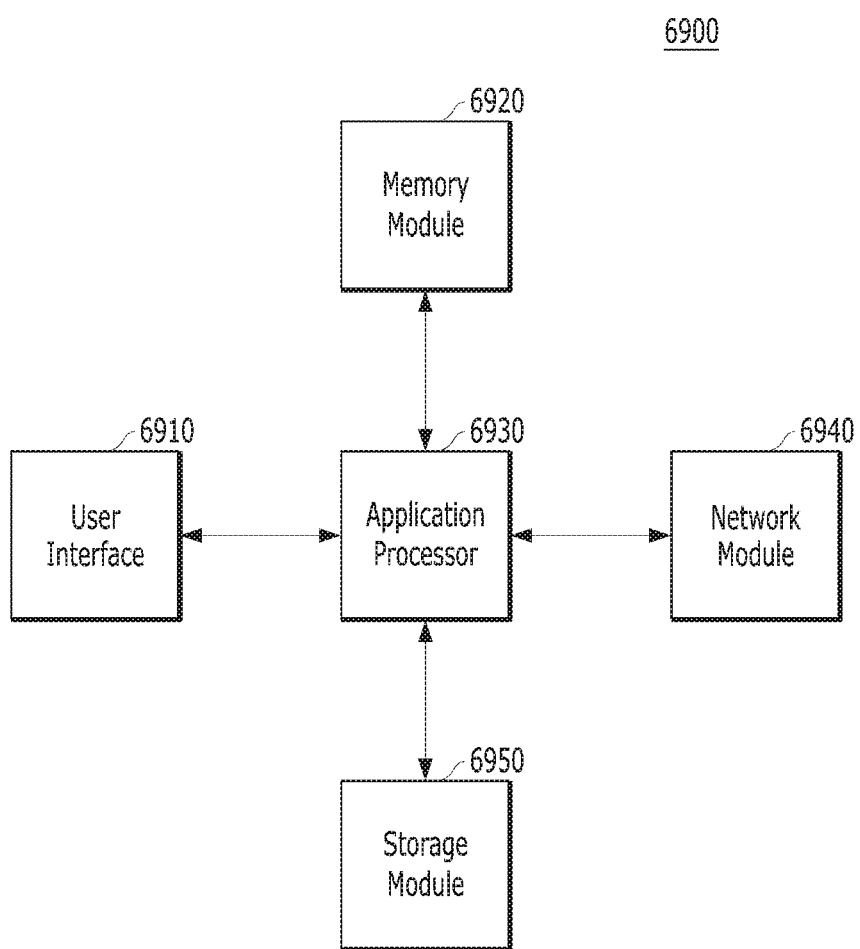

FIG. 16 is a diagram schematically illustrating another example of the data processing system including the memory system in accordance with an embodiment. In particular, FIG. 16 illustrates a user system to which the memory system may be applied.

Referring to FIG. 16, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as a System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but may also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 10 to 15.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control the operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

While the present invention has been described with respect to specific embodiments, it will be apparent to those skilled in the art in light of the foregoing disclosure that various changes and modifications may be made without departing from the spirit and scope of the invention as determined in the following claims.

What is claimed is:

1. A controller comprising:
   a ROM code register configured to generate and store a ROM code including a plurality of firmware images; and
   a ROM controller configured to change an operation setting of a ROM based on an operation firmware image of the plurality of firmware images,
   wherein each of the plurality of firmware images includes an image header including attribute information on a corresponding firmware image and image data, and
   wherein the operation firmware image includes, as its image header, an operation image header, which includes an operation mode field indicating whether the operation setting of the ROM is changed, and, as its image data, operation image data including information on the operation setting of the ROM.

2. The controller of claim 1, wherein the ROM controller determines whether the operation setting of the ROM is changed, based on the operation mode field of the operation image header, and changes the operation setting of the ROM based on the operation image data.

3. The controller of claim 1, wherein the operation setting of the ROM includes a clock setting and a PLL setting.

4. The controller of claim 1, wherein the ROM controller controls a memory device so that target data stored in the memory device is read based on a main firmware image of the plurality of firmware images, and
   wherein the main firmware image includes a main image header including attribute information of the main firmware image and main image data corresponding to the target data.

5. The controller of claim 1, wherein each of the plurality of firmware images is formed in a linked list structure.

6. The controller of claim 1, wherein the operation image header further includes a logging field, and
   when the logging field is activated, a log of the ROM code is activated by a setting value of the logging field, so that the ROM controller performs debugging.

7. The controller of claim 6, wherein the debugging includes universal asynchronous receiver/transmitter (UART) debugging.

8. The controller of claim 1, wherein the operation image header further includes a name and a type of a firmware image corresponding to the operation image header, and information on an image header to be processed subsequently.

9. The controller of claim 1, wherein the ROM controller distinguishes the operation firmware image and a main firmware image from each other based on their image headers.

10. The controller of claim 1, wherein, when a first firmware image included in the ROM code is read, the ROM controller reads the first firmware image based on a basic operation setting of the ROM.

11. An operation method of a controller, comprising:
    generating and storing a ROM code including a plurality of firmware images; and
    changing an operation setting of a ROM based on an operation firmware image of the plurality of firmware images, wherein each of the plurality of firmware images includes an image header including attribute information on a corresponding firmware image and image data, and wherein the operation firmware image includes, as its image header, an operation image header, which includes an operation mode field indicating whether the operation setting of the ROM is changed, and, as its image data, operation image data including information on the operation setting of the ROM.

12. The operation method of the controller of claim 11, wherein, in the changing of the operation setting of the ROM, whether the operation setting of the ROM is changed is determined based on the operation mode field of the operation image header, and the operation setting of the ROM is changed based on the operation image data.

13. The operation method of the controller of claim 11, wherein the operation setting of the ROM includes a clock setting and a PLL setting.

14. The operation method of the controller of claim 11, further comprising:
controlling a memory device so that target data stored in the memory device is read based on a main firmware image of the plurality of firmware images, wherein the main firmware image includes a main image header including attribute information of the main firmware image and main image data corresponding to the target data.

15. The operation method of the controller of claim 11, wherein each of the plurality of firmware images is formed in a linked list structure.

16. The operation method of the controller of claim 11, wherein the operation image header further includes a logging field, and
wherein the operation method further comprises:
performing debugging in a state in which a log of the ROM code is activated by a setting value of the logging field, when the logging field is activated.

17. The operation method of the controller of claim 11, wherein the operation image header further includes a name and a type of a firmware image corresponding to the image header, and information on an image header to be processed subsequently.

18. The operation method of the controller of claim 11, wherein the operation firmware image and a main firmware image are distinguished from each other based on their image headers.

19. The operation method of the controller of claim 11, further comprising:
reading a first firmware image based on a basic operation setting of the ROM when the first firmware image included in the ROM code is read.

20. A memory device comprising:
a ROM code register configured to store a ROM code including a plurality of firmware images; and
a ROM controller configured to change an operation setting of a ROM of the memory device based on an operation firmware image of the plurality of firmware images,
wherein each of the plurality of firmware images includes an image header including attribute information on a corresponding firmware image and image data,
wherein the image header of the operation firmware image includes an operation mode field indicating whether the operation setting of the ROM is changed, and the image data of the operation firmware image includes information on the operation setting of the ROM, and
wherein the ROM controller is further configured to determine whether the operation setting of the ROM is changed, based on the operation mode field of the image header of the operation firmware image, and to change the operation setting of the ROM based on the image data of the operation firmware image.

* * * * *